United States Patent Office
2,964,924
Patented Dec. 20, 1960

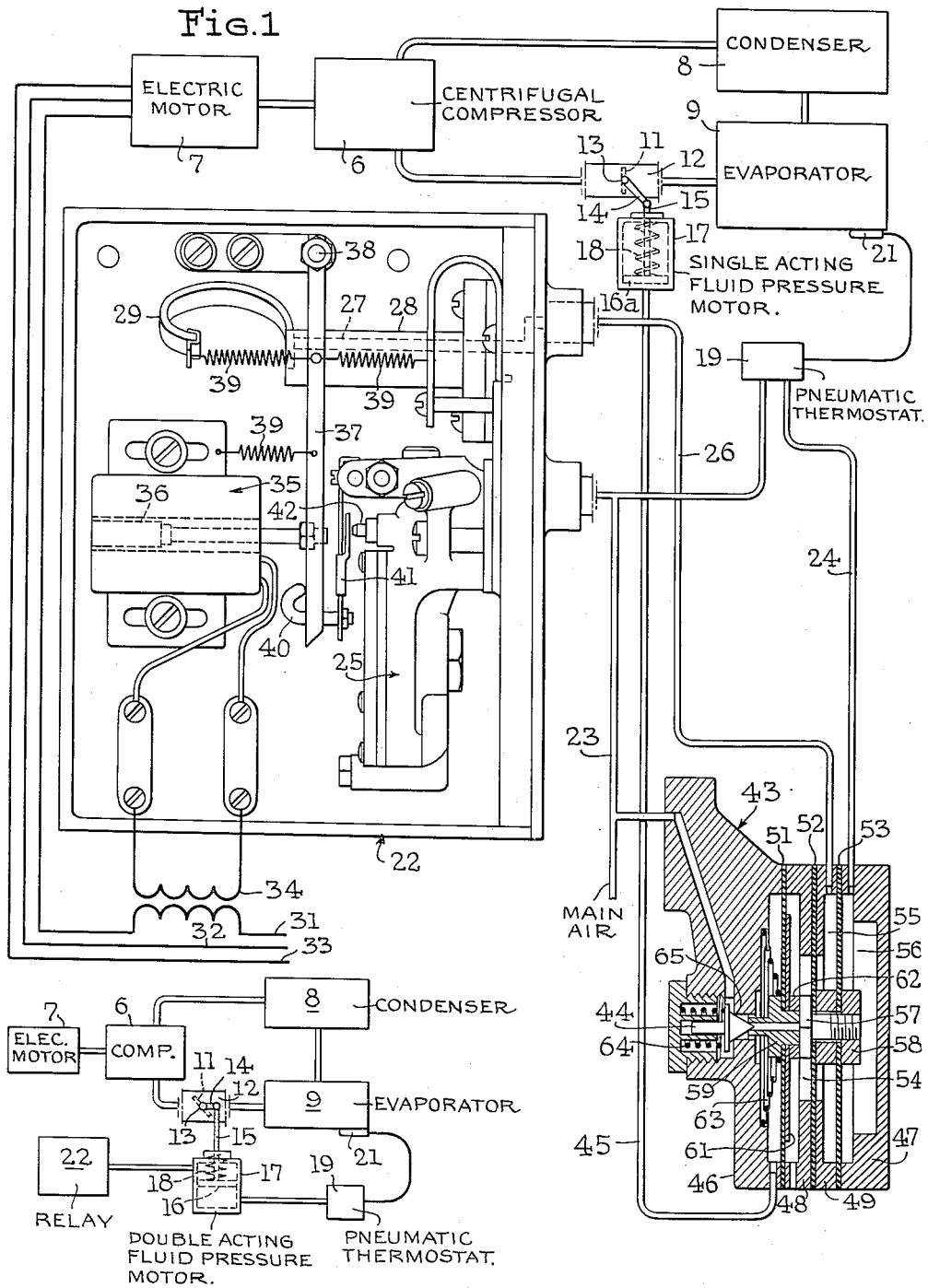

2,964,924
REFRIGERANT FLOW CONTROL APPARATUS

Austin P. Dodge, Bethesda, Md., assignor to Johnson Service Company, Milwaukee, Wis., a corporation of Wisconsin Filed Aug. 15, 1958, Ser. No. 755,350

3 Claims. (Cl. 62—209)

This invention relates to the control of refrigerative compressors used in compressor-condenser-evaporator circuits, and to that known type of control in which a valve (sometimes called a damper) limits the rate at which refrigerant flows in the circuit.

There are two types of control which can be effected by the use of such a damper. The first is regulation of the over-all refrigerative effect, during normal operation. The second is limitation of load on the compressor during starting up, or at any other time when the compressor tends to pick up an abnormal load.

A logical location for the damper is immediately in advance of the compressor intake. The most distinctive feature of the present concept is the fact that while the controls operate through the same damper, they are virtually distinct and so can be designed on the basis of independent factors characteristic of particular compressors.

The regulation during normal running is effected by a thermostat (desirably pneumatic) which is what is known as a class 1, or direct-acting instrument; i.e. one in which a rise in temperature causes a rise in regulating pressure in what, in this art, is commonly called the branch line. This thermostat responds to the temperature created by the evaporator and on excessive fall of such temperature acts in its damper closing direction. On rise of such temperature it opens the dampers.

The regulation during abnormal conditions such as starting up a warm compressor involves control of the same damper effected by wholly different means, namely, an electrically operated valve which controls flow of compressed air to operate the damper oppositely and so, when active, tends to close the damper. The arrangement is such that the opening of the electrically operated damper-closing valve is proportional to the excess of the motor current above a chosen value. Should both controls function simultaneously, as they may do, the pressures act on the damper motor oppositely.

From this last flows the convenient fact that the damper-motor may be double-acting with the thermostat controlling pressure in one of its working spaces and the electrically actuated valve controlling an opposing pressure in the other of its working spaces.

To accelerate action, and expedite response of a larger damper motor, it is standard practice in the damper control art to use a double-diaphragm relay or cumulator. Such an arrangement will be illustrated.

In the drawing:

Figure 1 is a diagram largely in section showing the preferred embodiment.

Figure 2 is a simplified diagram of the system comprising only the basic components.

Refer first to Figure 2.

In this diagram 6 represents a compressor assembly of the turbine type, driven by an electric motor 7. The compressor 6 delivers compressed refrigerant into the cooled condenser 8 in which the compressed and cooled vaporous refrigerant liquefies. The cooled liquefied refrigerant discharges through an expansion valve (not shown, but conveniently a low side float valve) into the evaporator 9. Here it absorbs latent heat of vaporization, effects refrigeration and performs the usual refrigerative functions.

Between the evaporator 9 and the intake of compressor 6 is a damper 11 controlling flow through a housing 12 and thus regulating flow of refrigerant from the evaporator to the compressor, with attendant control of the total refrigerating effect.

The damper 11 is turned on a shaft 13 by a crank 14, piston rod 15 and piston 16. The piston is reciprocable in cylinder 17. Piston 16 is double-acting and biased downward by a spring 18 of appropriate strength. The pressure in cylinder 17 below piston 16 is developed by a pneumatic thermostat 19 controlled by bulb 21 which is subject to evaporator temperature (or some temperature related thereto). The pressure in cylinder 17 above piston 16 is developed by an electrical relay valve 22 and is proportional to the amount that electric current, drawn by motor 7, exceeds a chosen value.

Thus the rate of flow of refrigerant is controlled in response to the difference between two independent variables, (1) evaporator temperature (which exerts an increasing valve-opening force on damper 11 as evaporator temperature rises), diminished by (2) a valve closing force which is proportional to the excess of current demand above a chosen value. Thus the controlling action is rapid, direct, and of elemental simplicity.

It may be mentioned at this point that a damper is only one of several flow-retarding means used in this art, and is here shown in the interests of simplified description. One alternative comprises pre-rotation vanes such as the vanes 28 shown in the patent to Anderson, 2,830,755, April 15, 1958.

The embodiment above-described with reference to Fig. 2 is operative, but since the usual relays used with pneumatic thermostats operate at pressures below 20 p.s.i. (gage) it is customary to furnish booster relays to permit rapid handling of larger damper units or their analogues. Fig. 1 shows the incorporation of dual relays (produced by applicant's assignee under the name "cumulator").

In Fig. 1 the parts numbered 6 to 22 except the piston 16a may be the same as in Fig. 2. Instead of the double-acting piston 16 of Fig. 2, Fig. 1 makes use of a single acting piston 16a. The double-acting effect is transferred to the cumulator not used in Fig. 2. The pneumatic thermostat 19 may, and desirably does, conform to the Otto Patent, 1,500,260. This relay has long been standard with Johnson Service Company and requires no detailed description. It is a class 1 instrument. The thermostatic bar 32 of that patent may be, and commonly is replaced with units of various well known forms. A bulb suited to sense the temperature in the evaporator 9 would be selected to perform the function of bulb 21. No novelty inheres in this detail.

The main air line 23 is the supply line for the thermostat 19, the relay 22 and the cumulator hereinafter described. The branch line of the thermostat 19 is indicated at 24.

The relay valve 22 diagrammed in Fig. 2 is illustrated in detail in Fig. 1. It is identified by reference number 22 applied to the case of the instrument. In said case is a pneumatic relay 25 also constructed according to the Otto Patent 1,500,260. Its air supply comes from line 23 and its branch line appears at 26. Communicating with branch line 26 is a passage 27 which leads through bracket 28 to a Bourdon tube 29 supported by bracket 28. The Bourdon tube performs a feed-back function familiar in the control art.

The electric motor 7 receives current through three lines 31, 32, 33. Line 31 includes the primary of a transformer whose secondary 34 energizes the windings of a sleeve-like cylindrical solenoid 35 (i.e., a sucking coil) to an extent dependent on the current drawn by motor 7. The armature 36 of the solenoid is carried by a lever 37 hinged at 38 and positioned by three coil-type tension springs 39. The armature swings through the hollow core of solenoid 35. A hook 40 on lid 41 engages lever 37 and controls the coaction of the lid with leak port 42. This lid and leak port assembly operates relay 25 as a class 1 instrument, to establish in branch line 26 a pressure which is proportional to the excess of motor current, above a chosen value.

The cumulator 43 is supplied with compressed air by line 23 and functions as a double-acting motor in which the pressures in branch lines 24 and 26 are the opposing motive pressures. The cumulator derives the algebraic sum of pressures in the branch lines 24 and 26 and causes this to control a relay valve 44 functionally identical with the admission and exhaust valve of Patent 1,500,260. In this way a single variable resultant pressure is derived and fed through line 45 to act on piston 16a (of Fig. 1). Thus, damper 11 is controlled in response to the combined effect of two opposed motive pressures.

The cumulator 43 is composed of a back plate 46 (in which the admission and exhaust valve 44 is housed and guided), a cupped front plate 47 and two interposed spacing and chamber-forming rings 48 and 49. Diaphragms 51, 52 and 53 are clamped at their peripheries and sealed to these rings.

The diaphragm 51 separates the chamber from which connection 45 leads from an atmospheric chamber 54 from which an atmospheric vent port leads as is clearly shown in the drawing. The diaphragm 53 separates the motor chamber 55 connected with branch line 26 from motor chamber 56 connected with branch line 24. The diaphragms 52 and 53 are clamped together at the center with an interposed spacer by screw 57 and nut 58.

In the center of diaphragm 51 is mounted a flanged hub 59, with an axial port as shown. This port is the exhaust port leading from the hub 45 through the hub to atmospheric chamber 54. A stiffening disc 61 is held against the central portion of diaphragm 51 by a nut 62 which is on a stem formed on hub 59. The head of screw 57 and hub 59 are in thrust engagement. The hub is shown biased forward by spring 63, but this spring is not essential to operation of cumulator 43.

The valve 44 is guided in back plate 46 and biased to the right (forward) by a coil compression spring 64.

When thermostat pressure in branch line 24 is dominant hub 59 is forced to the rear so that valve 44 closes the axial exhaust port in hub 59.

When relay valve pressure in branch line 26 is dominant, hub 59 is freed to move forward (i.e. to the right), valve 44 seats on inlet seat 65 and the exhaust port through hub 59 opens, venting the motor 17.

Thus the cumulator controls motor 17. The pressures developed in motor 17 can be boosted pressures and can be quickly developed because the main air in line 23 is the source of supply.

The invention particularly as embodied in Fig. 1 offers fast positive action, even where a large damper must be operated. The two controls are of diverse types and are individually developed, so that each may be designed strictly with regard to a single function. This characteristic greatly simplifies the problem of adapting a dual control to compressors of different sizes.

What is claimed is:

1. In a compressor-condenser-evaporator refrigerative circuit unit of the type including adjustable throttling means for varying the rate of refrigerant flow through the compressor and an electric motor serving to drive the compressor, the combination of control means shiftable in opposite directions to adjust said throttling means; pressure motor means for shifting said control means and having two opposed working spaces, respectively for shifting the throttle in opening and in closing directions; a direct-acting thermostat responsive to temperatures developed by said evaporator and connected to establish a directly related varying pressure in the throttle-opening working space; supply means connected to deliver air to the other working space; and a pressure regulating valve for varying the pressure delivered to said other working space by said supply means in direct relation to the amount by which the current drawn by the electric motor exceeds a chosen value.

2. A control for refrigerative units comprising a compressor, a condenser and an evaporator connected to form a refrigerative circuit; a source of electric current; a motor supplied thereby and serving to drive the compressor; throttling means for controlling the rate of flow of refrigerant through the circuit and shiftable progressively between maximum and minimum flow positions; and two means, connected with throttling means, for developing independently variable opposed pressures which tend to shift said throttling means in relatively opposite directions, namely a pneumatic direct-acting thermostat responsive to evaporator temperature and urging a shift toward maximum flow position, and an electrically actuated valve which opens proportionately to excess electric current above a chosen value to urge a shift toward minimum flow position.

3. The combination of a refrigerative unit of the compressor-condenser-evaporator circuit type; a drive for the compressor of said unit comprising a source of electric current and a related electric motor; a source of compressed air for operating controls; adjustable throttling means serving to control the rate of flow of refrigerant through the unit; two fluid-pressure-developing regulating units oppositely connected with the throttling means and which are activated as an incident to operation of the refrigerative unit and energized by compressed air, the first of which is a pneumatic thermostat subject to the varying temperature developed by the evaporator, and serving to develop a pneumatic pressure which varies directly with said temperatures and acts to shift said throttling means in its opening direction, and the second of which is an electrically controlled pressure regulating valve fed with compressed air, variably opened in direct proportion to the excess of electric current drawn by said motor above a chosen valve, and serving to develop a pneumatic pressure which acts to shift said throttling means in its closing direction.

References Cited in the file of this patent

UNITED STATES PATENTS

| | | |
|---|---|---|
| 2,453,095 | McGrath | Nov. 2, 1948 |
| 2,601,867 | Alyea | July 1, 1952 |
| 2,817,213 | Miner | Dec. 24, 1957 |
| 2,837,286 | Ross | June 3, 1958 |